May 21, 1968      F. W. BOOTH      3,383,878

CONDENSER-SEPARATOR

Filed May 1, 1967

INVENTOR
FRANKLIN W. BOOTH

BY

ATTORNEYS 3,383,878
CONDENSER-SEPARATOR
Franklin W. Booth, 421 Cynthia Drive,
Hampton, Va. 23366
Filed May 1, 1967, Ser. No. 635,971
5 Claims. (Cl. 62—281)

ABSTRACT OF THE DISCLOSURE

A condenser-separator utilizing plates associated with coolant containers and having gutters for collection of condensate blown thereinto by an airstream passing over the plates. The plates are at an angle to the airstream such that the collected condensate is blown into a substantially vertical trough that carries the condensate to a conduit having a wick and sintered metal plate upstream of a suction pump connected with the conduit.

---

The invention described herein was made by an employee of the United States Government and may be manufactured and used by or for the Government for governmental purposes without the payment of any royalties thereon or therefor.

This invention relates generally to a condenser and more particularly to a condenser-separator for removing condensable liquid from an airstream in either a zero or one gravity environment.

The present state of the art of phase separators or condenser-separators for liquids involves a multi-step process. The first step condenses liquid from the gas or airstream with a conventional condenser coil. The condensate thus formed on the coil is blown, by the velocity of the gas stream, along the length of the condenser plates or fins. After passing across these coil fins, the condensate is blown from the trailing edge of the fins, in the form of droplets or aerosols, and thus reenters the airstream in various size droplets. The next step in the present state of the art is to pass the gas and aerosols through a mechanical device where an effort is made to separate these aerosols from the gas stream, as for example by centrifugal forces. Separation of the aerosols in the low micron size is a very difficult process and is the basis of the present difficulties encountered by life support designers. Various other units for distillation or removal of liquid from an airstream have been devised utilizing various materials for the centrifuge bowl or the collector element. For example, it is known that utilization of a sponge or porous material on the centrifuge bowl permits collection of condensate. However, such a system requires complicated mechanical devices for removing the condensate entrained in the porous material. Furthermore, these known devices generally require a gravity environment, are cumbersome and seldom have sufficient reliability to warrant incorporation in a spacecraft.

In view of the disadvantages of the prior art, it is an object of the instant invention to provide a device for condnensing liquid from an airstream and collection of the condensate without creating an aerosol problem.

Another object of this invention is to provide a condenser-separator eliminating the formation of aerosols in collecting condensate from a gas stream.

A further object of the instant invention is to provide a condenser-separator for removing a condensable liquid from a gas stream without creating an aerosol by utlization of fins having gutters for directing the condensate to a drain system operational in an environment ranging from zero to one gravity.

A still further object of the instant invention is to provide a condenser-separator having plates upon which condensate is formed and blown by an airstream to gutters connected with a drain system to remove liquid from the gas stream without creation of aerosols.

Generally, the foregoing and other objects are accomplished by providing a condenser-separator unit having tubular members for containing a coolant with a plurality of plates or fins attached to the tubes and arranged at an angle to the flow of the airstream. The fins have gutters adjacent to or on their downstream sides and edges into which condensate is blown and collected at a corner from which it is drained into a conduit having a wick and sintered metal plate.

A more complete appreciation of the invention and many of the attendant advantages thereof will be readily apparent as the same becomes better understood by reference to the following description when considered in connection with the accompanying drawings wherein.

Figure 1:
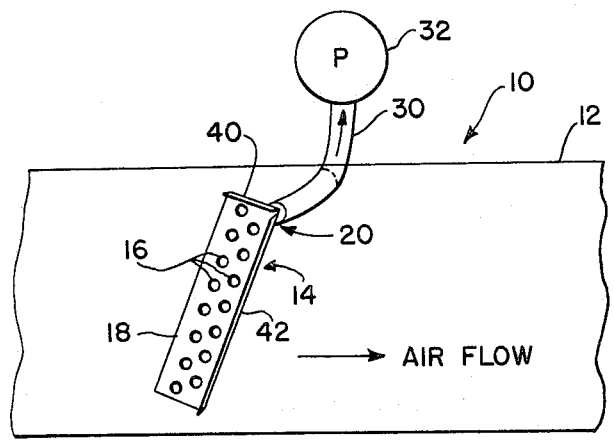
FIG. 1 is a top diagrammatic view of a condenser-separator unit of the instant invention.
Figure 3:
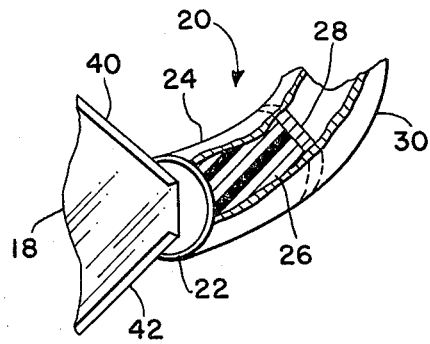
FIG. 3 is an enlarged top view of a portion of the invention shown in FIG. 1.

Referring now to the drawings, and more particularly to FIG. 1, wherein the instant condenser-separator unit 10 is shown to include duct 12 for containing the airstream and condenser 14 having coolant tubes 16 and fins or plates 18. Drain or collector 20 includes a substantially vertical channel 22 connected with drain conduit 24. Wick 26 and sintered metal plate 28, see FIG. 3, are disposed in conduit 24 for a purpose to be described more fully hereinafter. Conduit 30 connects drain pipe 24 with suction pump 32.

Figure 2:
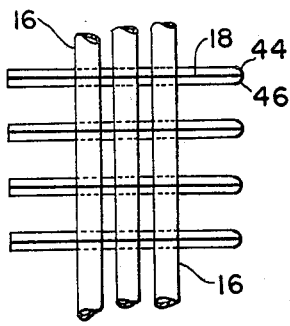
FIG. 2 is a side elevational view of a portion of the unit of FIG. 1.
Figure 4:
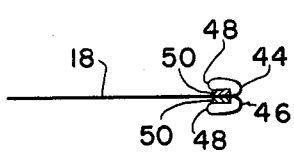
FIG. 4 is an enlarged end view of a plate element of FIG. 2.

FIGS. 1, 2 and 4, show fins 18 having end 40 and downstream side 42. The downstream portions 40 and 42 of fins 18 have a top roll and a bottom roll forming gutters 44 and 46, respectively, for collection of condensate. Gutters 44 and 46 may include a rolled under portion 48, FIG. 4, that retains wicks 50.

Figure 5:
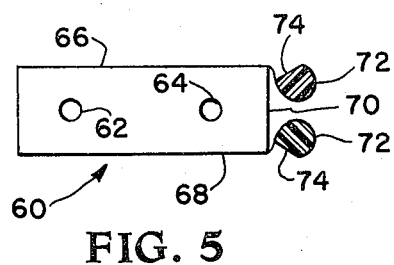
FIG. 5 is an elevational view of an alternative embodiment of a coolant device for incorporation in the instant invention when applicable to a plate fin configuration.

Referring now to FIG. 5 wherein an alternative embodiment of the condenser unit of FIG. 1 is shown to include coolant chamber 60 having inlet 62 and outlet 64 for a coolant. Top plate 66 and bottom plate 68 extend across chamber 60 and terminate on downstream side 70 in a pair of troughs or gutters 72. Wicks 74 are located in gutters 72 in order to retain condensate blown into gutters 72 from top plate 66 and bottom plate 68 by the airstream flowing thereover.

OPERATION

An airstream containing a condensable liquid is blown through duct 12 by a fan or other device, not shown, and encounters condenser unit 14, FIG. 1. Due to coolant flowing through tubes 16 and lowering the temperature of fins 18, fins 18 collect condensate thereon which is blown by the airstream into gutters 44 and 46. Condenser unit 14 is disposed at an angle other than 90° to the direction of flow of the airstream and, accordingly, the condensate on plates 18 is blown into gutters 44 and 46 and along the gutters to the corner adjacent drain or collector 20. Vertical channel 22 is attached to plates 18, as by brazing, and as the condensate reaches the corner of fins 18 it is blown into channel 22 and flows downwardly to drain pipe 24 or, more accurately, into wick 26. Wick 26 can be of any conventional material, such for example as a porous plastics material which would retain the condensate therein. In some applications it may be advisable to utilize a similar type wick in vertical channel 22, as well as wick 50 in gutters 44 and 46. However, it is to be understood that in normal operation, especially in a one gravity environment, it is unnecessary to utilize wick 50 or a wick in vertical channel 22 because of gravity effects.

Wick 26 absorbs the condensate and maintains the upstream side of sintered metal plate 28 in a wet condition thereby permitting a pressure differential between the wick side of plate 28 and the suction pump 32 side of plate 28. This feature permits the flow of condensate, while preventing the flow of air, through plate 28. As noted hereinabove, suction pump 32 functions to lower the pressure on the downstream side of plate 28 and to pump the condensate from conduit 30 into a reservoir or heat exchanger, not shown.

The embodiment of the condenser unit shown in FIG. 5 functions in a manner similar to the unit described in copending application Ser. No. 635,970, filed on May 1, 1967. A coolant liquid flows into coolant chamber 60 through inlet 62 and is discharged through outlet 64. As the coolant flows through chamber 60 it lowers or reduces the temperature of top plate 66 and bottom plate 68. The lower temperature of plates 66 and 68 causes the condensable liquid in the airstream to condense into a thin film of liquid on plates 66 and 68 from which it is blown into gutters 72. Wick 74 in gutters 72 on downstream side 70 of chamber 60 may be omitted in some applications. However, wicks 74 do function to absorb the condensate and assist in conveying it to vertical channel 22 from which it is drawn by suction pump 32 into conduit 30 through wick 26 and sintered metal plate 28.

The trailing edge of condensing plates 66 and 68 is at an angle other than 90° to the gas stream and gutters 44 and 46 are placed along the trailing edge of the plates for collection of condensate. In operation the condensate forms on the surface of condensing plates 66 and 68 and is caused to flow toward the trailing edge of these plates by the velocity of the airstream. The thickness of the condensate film is thin enough and the cohesion of the film to the wetted plate surface is great enough to eliminate any condensate from reentering the gas stream. Because of this condensate flow pattern along the plates 66 and 68, it now enters gutters 44 and 46. These gutters are configured to hold a given depth of condensate in either a zero or one gravity environment. Due to the angle of the gutters with respect to the angle of the airstream, the velocity pressure of the airstream will cause any condensate trapped within the gutters to travel to one point at the side of the plate. At this point the gutters enter the piping system. The condensate is passed through wafer or plate 28 of sintered metal which will pass no air if it is maintained in a wetted condition. Due to the fact that gutters 44 and 46 are not full and will not wet the entire sintered wafer 28, wick 26 is placed in front of the wafer. This will cause the entire surface of sintered wafer 28 to be wetted and therefore pass no air. A differential pressure is maintained across the wafer to allow passage of condensate as a solid liquid.

Thus, it is seen that the instant invention provides a unique system for a one step process of dehumidifying an airstream by utilizing gutters for drawing condensate formed on condensing plates into a drain and piping system. The instant inventive system prevents the formation of aerosols with the resultant difficulties of removal and prevents the entrapment of air in the liquid condensate stream which could cause further separation problems.

The high pressure side of the drain causes pressures high enough to permit solid water to be passed through the sintered metal plate. Thus, the instant invention provides a highly reliable and efficient condenser-separator for dehumidifying an airstream in both a one gravity and a zero gravity environment.

Obviously, many modifications and variations of the subject invention are possible in light of the above teachings. It is therefore to be understood that within the scope of the appended claims the invention may be practiced otherwise than as specifically described.

What is claimed as new and desired to be secured by Letters Patent of the United States is:

1. A condenser-separator comprising:
    coolant means for cooling an airstream and forming condensate;
    plate means in cooperative association with said coolant means and having trough means for collecting condensate; and
    drain means including a wick and sintered metal plate in a conduit for conveying the condensate, whereby condensate formed on said plate means is blown by the airstream into said trough means from which it flows into said wick, through said sintered metal plate and into said conduit.

2. The condenser-separator of claim 1 wherein said coolant means and said trough means are disposed at an angle other than 90 degrees to the direction of flow of the airstream, whereby the airstream causes condensate collected on said plate means to flow into said trough means and therealong to the downstream corner of said plate means where it enters said drain means.

3. The condenser-separator of claim 2 wherein said drain means comprises a substantially vertical channel affixed to said plate means and having the lower end connected to a conduit;
    wick means in said conduit adjacent said channel;
    a sintered metal plate of substantially the inner area of said conduit and disposed in said conduit in substantially complete contact with the downstream side of said wick means; and
    a suction pump connected with said conduit, whereby said pump effects a pressure differential between the wick means and pump sides of said sintered metal plate to permit condensate collected by said wick means to flow through said sintered metal plate while preventing air from passing therethrough.

4. The condenser-separator of claim 3 wherein said coolant means includes a plurality of tubes;
    said plate means being a plurality of thin fins having the downstream edges thereof rolled to form upper and lower gutters comprising said trough means.

5. The condenser-separator of claim 3 wherein said coolant means comprises a chamber for passage of a coolant therethrough;
    said plate means being substantially planar and extending across at least two surfaces of said chamber; and
    said trough means formed of an upper and lower gutter in communication with said plate means.

References Cited

UNITED STATES PATENTS

| | | | |
|---|---|---|---|
| 2,134,544 | 10/1938 | Ashley | 62—271 |
| 2,952,993 | 9/1960 | Bosworth | 62—94 |
| 3,304,696 | 2/1967 | McKenna | 62—93 |
| 3,359,753 | 12/1967 | Fiedler | 62—93 |

WILLIAM J. WYE, *Primary Examiner.*